UNITED STATES PATENT OFFICE.

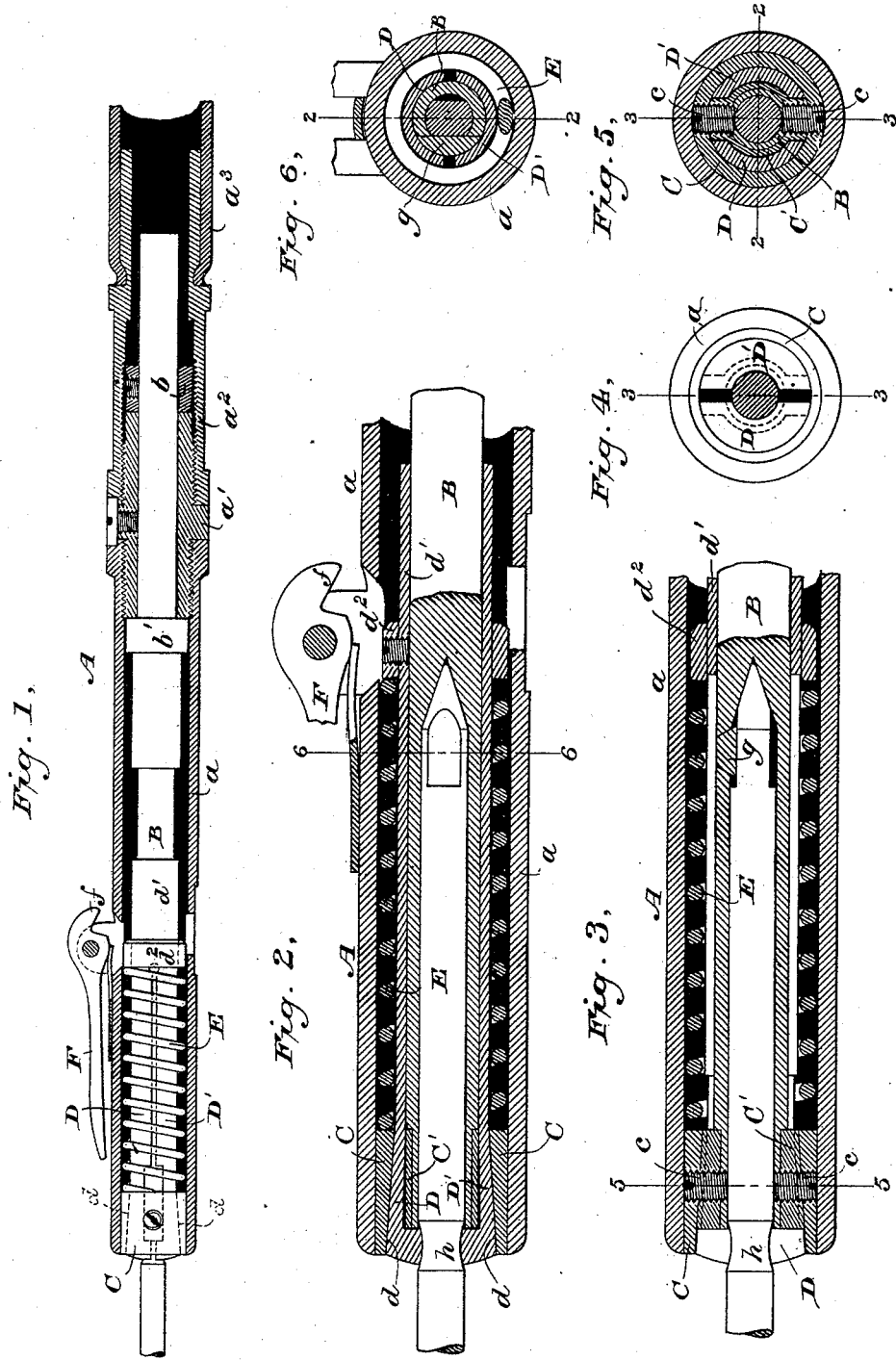

ELI T. STARR, OF PHILADELPHIA, PENNSYLVANIA, ASSIGNOR TO JAMES W. WHITE, J. CLARENCE WHITE, AND H. M. LEWIS, OF SAME PLACE, TRUSTEES, UNDER THE WILL OF SAML. S. WHITE, DECEASED.

DENTAL-ENGINE HAND-PIECE.

SPECIFICATION forming part of Letters Patent No. 232,311, dated September 14, 1880.

Application filed July 9, 1880. (Model.)

*To all whom it may concern:*

Be it known that I, ELI T. STARR, a citizen of the United States, residing in the city and county of Philadelphia, in the State of Pennsylvania, have invented certain new and useful Improvements in Dental-Engine Hand-Pieces, of which the following is a specification.

My present invention relates more especially to dental-engine hand-pieces of the class in which the tool is locked in the socket of the rotary tool-holder or chuck by means of laterally-yielding clamping jaws or devices.

The object of my invention is to produce a hand-piece superior to those of its class heretofore in use; and my said invention consists of certain new combinations and organizations of devices pointed out at the close of the specification.

The accompanying drawings represent my said improvements as embodied in the best way now known to me.

In said drawings, Figure 1 is a longitudinal central section through the hand-piece casing enlarged, a tool being shown as clamped in the spindle tool-holder or chuck. Fig. 2 is a longitudinal central section through the front end of the hand-piece casing and through the tool-holder or chuck in the plane indicated by the line 2 2 of Figs. 5 and 6. Fig. 3 is a similar section in a plane at right angles to that of Fig. 2, as indicated by the line 3 3 in Figs. 4 and 5. Fig. 4 is a view of the front end of the hand-piece. Fig. 5 is a transverse section through the hand-piece on the line 5 5 of Fig. 3, and Fig. 6 is a similar section on the line 6 6 of Fig. 2.

The views depicted in Figs. 2 to 6, inclusive, are on a scale still larger than that of Fig. 1.

The casing A of the hand-piece preferably consists of a sectional one composed of four tubular sections, to wit: of a handle-section, $a$, which envelops the tool-holder or chuck B and gives it bearing near its front end; of a section, $a'$, which is connected with the handle-section by screw-threads, so as to permit ready disconnection of said handle-section for the purpose of oiling the bearings, &c., and gives bearing to the rear journal of the chuck; of a section, $a^2$, connected with the section $a'$ by screw-threads, so as to permit of the separation of said sections to expose an adjustable collar, $b$, on said chuck; and of a shank-section, $a^3$, which is connected with the section $a^2$ by a swivel-joint, so as to permit the handle-section which is grasped by the hand to direct the tool and hold it to its work, (held ordinarily centrally of the fingers and thumb of the operator, somewhat in the manner of holding a pen or pencil,) to be turned or swiveled around the chuck relatively to said shank-section, in order to conform to the turning movements of the hand of the operator in manipulating the tool. Said shank-section $a^3$ is connected, in practice, with the outer or free end of a flexible sheath or tube extending from the usually upright engine-arm, while the butt-end of the tool-holder or chuck B is connected with the outer or free end of a flexible torsion-shaft enveloped by said sheath or tube, and rotated to give a rapid revolving motion to said chuck, the said flexible shaft or power-conveyer being connected with and driven by a pulley-driven spindle or stiff shaft of the engine.

Inasmuch as neither said flexible driving-shaft and sheath nor the peculiar construction of the engine form part of the present invention, they are not shown in the drawings, and I deem it unnecessary to describe them here in detail.

My patents of September 2 and November 25, 1879, respectively numbered 219,320 and 222,093, show what I consider to be good forms of flexible driving-shaft, sheath therefor, and engine, with which my present improvements may be used.

The tool-holder or chuck, as before stated, revolves on journals in bearings—one at front in the nose of the handle-section $a$ of the casing and another in rear in the section $a'$ thereof—the rotation of said chuck being steady and without wabbling or rattling movements.

In order to prevent endwise movement of the chuck in the casing it is provided with an annular enlargement or shoulder, $b'$, which abuts against the annular shoulder formed by the front end of the section $a'$ of the casing, said shoulder or enlargement $b'$ constituting the thrust-bearing of the chuck, so that when a thrust or push cut is being made by the tool it will prevent inward movement of the chuck in the casing, while upon the chuck in rear of the casing-section $a'$ is secured an annular ring or collar, $b$, which is adjusted so as to abut against the annular shoulder formed by the butt-end of said casing-section $a'$, and constitutes the pull-bearing of the chuck, preventing movement of said chuck outward when a pulling or draw cut is being made by the operating-tool.

It will be seen that as the collar $b$ is adjustable endwise on the chuck, wear of said chuck or of the casing-section $a'$ may be compensated or taken up and all looseness or rattling of the chuck obviated. This arrangement, however, I do not claim as my invention, as it is very old.

The front end of the chuck or tool-holder B is socketed, as usual, for the reception of the driving ends of the shanks of the operating-tools. The journal at said front end of the chuck consists of a hard-metal annulus or ring, C, fitting snugly the front end of the casing, said annulus being rigidly connected with the chuck, so as to form part thereof, preferably by screws $c\ c$, which pass from opposite sides through the annulus and an interposed bridge-piece, C', encircling the chuck, into the walls of said chuck. (See Figs. 1, 3, and 5.)

The sides of the interposed bridge-piece C' are reduced or cut away, (see Figs. 2 and 5,) so as to form passages or openings for the two members D D' of the split spring-jawed tool-lock, which members pass at their front ends through the passages formed for them between the annulus C and the bridge-piece C', and are provided on their outer peripheries each with conical or tapering surface $d$, so that when drawn inwardly within the tapering mouth of the annulus C said members will be compressed together upon the tool-shank, which is passed through an opening formed centrally in said spring-jaws into the socket of the chuck, and thereby lock said tool in the chuck-socket from endwise movement.

The members of the tool-lock, at their rear ends, are united into a sleeve, $d'$, surrounding the chuck, and this sleeve is provided with an annular shoulder or collar, $d^2$, between which and the annulus C a coiled spring, E, is compressed, the said spring at all times exerting its force to draw the locking ends of the members of the tool-lock into the mouth of the said annulus to compress them together.

In order to move said tool-lock forward so as to carry the conical head formed by its members out of the mouth of the annulus C, which will permit the jaws to expand or spring apart and release the tool, I pivot externally upon the casing a lever, F, having a projecting end or nose, $f$, which, when the long end of said lever is raised, engages the rear side of the collar $d^2$, and as the lever is rocked backward upon its pivot carries the locking devices forward against the tension of the spring E. As soon as the lever is returned to its normal position, as shown in Figs. 1 and 2, the spiral spring E immediately retracts the ends of the tool-locking members within the annulus C to grasp the tool-shank should such be inserted between said members into the chuck-socket.

In order to lock the tool-shank in the chuck-socket against independent turning movements, and to drive it positively with the chuck, I preferably provide the driving end of the round-shanked tool with a flat surface adapted to engage a driving lug or surface, $g$, extending into the chuck-socket; and I also preferably provide the tool-shank with a concave annular groove, $h$, for the reception of the locking ends of the members of the split spring-jawed locking device, as shown in Fig. 2, which prevents more securely endwise movement of the tool in the socket and its withdrawal while in use.

I disclaim herein in favor of my application filed July 29, 1880, all patentable subject-matter common to said application and this present one.

I claim as my invention—

1. The combination, substantially as hereinbefore set forth, of the spindle-chuck, the annulus constituting the journal at the front end thereof, the split or spring-jawed tool-locking device, movable endwise on the chuck and surrounded by said annulus, and a spring to retract the locking-jaws of the tool-lock within said annulus to compress them.

2. The combination, substantially as hereinbefore set forth, of the casing, the spindle-chuck, the tool-driving surface in the socket of the chuck, the endwise-movable split or spring-jawed tool-lock having a tapering head, the spring acting to compress the jaws of said tool-lock within an annulus constituting the front journal of the chuck, and the lever to move said tool-lock forward to release said jaws and permit them to expand or move laterally.

In testimony whereof I have hereunto subscribed my name.

ELI T. STARR.

Witnesses:
JOHN URIAN,
J. A. B. WILLIAMS.